US009912956B2

United States Patent
Fremlin

(10) Patent No.: US 9,912,956 B2
(45) Date of Patent: *Mar. 6, 2018

(54) SYSTEMS AND METHODS FOR ENHANCED VIDEO ENCODING

(71) Applicant: Facebook, Inc., Menlo Park, CA (US)

(72) Inventor: John Torres Fremlin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,129

(22) Filed: Jul. 31, 2017

(65) Prior Publication Data

US 2017/0332082 A1    Nov. 16, 2017

Related U.S. Application Data

(63) Continuation of application No. 14/179,499, filed on Feb. 12, 2014.

(51) Int. Cl.
*H04N 19/154* (2014.01)
*H04N 19/176* (2014.01)
*H04N 19/115* (2014.01)
*H04N 19/192* (2014.01)

(52) U.S. Cl.
CPC ......... *H04N 19/154* (2014.11); *H04N 19/115* (2014.11); *H04N 19/176* (2014.11); *H04N 19/192* (2014.11)

(58) Field of Classification Search
CPC .. H04N 19/154; H04N 19/115; H04N 19/176; H04N 19/192

USPC .................................................. 375/240.02
See application file for complete search history.

(56) References Cited

U.S. PATENT DOCUMENTS

| | | | |
|---|---|---|---|
| 8,351,509 | B1 | 1/2013 | Hurd |
| 8,743,954 | B1 | 6/2014 | Masterson |
| 2003/0223492 | A1 | 12/2003 | Drezner |
| 2010/0061446 | A1 | 3/2010 | Hands |
| 2012/0155553 | A1 | 6/2012 | Liao |
| 2012/0239767 | A1 | 9/2012 | DeLuca |
| 2014/0040498 | A1 | 2/2014 | Oyman |

*Primary Examiner* — William C Vaughn, Jr.
*Assistant Examiner* — Jae N Noh
(74) *Attorney, Agent, or Firm* — Sheppard Mullin Richter & Hampton LLP

(57) ABSTRACT

Systems, methods, and non-transitory computer-readable media receive a source video having a source file size. A bit rate at which to encode the source video is determined. The source video is encoded at the determined bit rate to produce an encoded video having a file size less than the source file size. A video quality metric for the encoded video is determined. Whether or not the video quality metric for the encoded video is within an allowable deviation from a target quality metric is determined. The source video is encoded at another determined bit rate when the video quality metric for the encoded video is outside the allowable deviation from the target quality metric. Determining the bit rate and encoding the source video at the determined bit rate can repeat iteratively until the video quality metric for the encoded video is within the allowable deviation from the target quality metric.

20 Claims, 11 Drawing Sheets

SYSTEMS AND METHODS FOR ENHANCED VIDEO ENCODING

CROSS-REFERENCE TO RELATED APPLICATIONS

This application is a continuation of U.S. patent application Ser. No. 14/179,499, filed on Feb. 12, 2014 and entitled "SYSTEMS AND METHODS FOR ENHANCED VIDEO ENCODING", which is incorporated herein by reference in its entirety.

FIELD OF THE INVENTION

The present technology relates to the field of multimedia processing. More particularly, the present technology provides techniques for an enhanced video encoding process.

BACKGROUND

Today, people have many options available to view, create, edit, or otherwise access multimedia content, such as images, audio, and video. In addition to traditional cameras, sound recorders, and video recorders, many mobile devices, such as smartphones, have the capability to take pictures, record audio, and capture video. In one example, a mobile device can include a camera and video capturing software that enables the user to record or capture videos using the camera included with the mobile device. The videos can be stored at the mobile device and accessed at a later time. In another example, the user can already have access to a video that he or she previously downloaded or otherwise acquired. In some cases, an internet social networking service can provide users with the ability to share multimedia content, including videos. Members of the multimedia-sharing social networking service can upload their videos to the multimedia-sharing social networking service.

In some cases, the videos or other multimedia content can be stored at the social networking service. For example, the social networking service can provide resources to store the videos or other multimedia content. However, as the amount of stored videos or other multimedia content increases, the amount of resources available to the social networking service decreases.

SUMMARY

To allow for realization of optimization objectives of a social networking system, embodiments of the invention include systems, methods, and computer readable media configured to provide enhanced video encoding compatible with the social networking system. In one embodiment, a source video having a source video file size is received by a computer system. A bit rate at which to encode the source video is determined. The source video is encoded at the determined bit rate to produce an encoded video that has a file size less than the source video file size. A video quality metric for the encoded video is determined. Whether or not the video quality metric for the encoded video is within an allowable deviation from a target quality metric is determined. The source video is encoded at another determined bit rate when the video quality metric for the encoded video is outside the allowable deviation from the target quality metric.

In one embodiment, encoding the source video at the other determined bit rate is performed iteratively until the video quality metric for the encoded video is determined to be within the allowable deviation from the target quality metric.

In one embodiment, the video quality metric for the encoded video is determined to be outside the allowable deviation when the video quality metric is substantially greater than the target quality metric. The other determined bit rate is selected to be lower than the bit rate at which the source video was encoded in a previous iteration.

In one embodiment, the video quality metric for the encoded video is determined to be outside the allowable deviation when the video quality metric is substantially less than the target quality metric. The other determined bit rate is selected to be higher than the bit rate at which the source video was encoded in a previous iteration.

In one embodiment, the video quality metric for the encoded video corresponds to at least one of a structural similarity (SSIM) index, a multi-scale structural similarity (MS-SSIM) index, or a peak signal-to-noise ratio (P SNR).

In one embodiment, the target quality metric corresponds to a structural similarity (SSIM) index of 0.975.

In one embodiment, determining the bit rate further comprises selecting the bit rate using, at least in part, a root finding algorithm.

In one embodiment, the root finding algorithm corresponds to at least one of Brent's method, Newton's method, a bisection method, a secant method, an interpolation method, or a combination thereof.

In one embodiment, the encoded video is stored when the video quality metric for the encoded video is within the allowable deviation from the target quality metric.

In one embodiment, access to the encoded video is provided in response to a media request.

In one embodiment, the source video is removed subsequent to the encoded video being stored.

In one embodiment, the determined bit rate at which to encode the source video is determined based on historical data.

In one embodiment, an original video is received prior to receiving the source video. A first-pass encoding process is applied to the original video to produce the source video having the source video file size.

In one embodiment, data about the original video is obtained during the first-pass encoding process.

In one embodiment, applying the first-pass encoding process to the original video includes encoding the original video at a first-pass bit rate to produce the source video having the source video file size.

In one embodiment, the determined bit rate at which to encode the source video is determined based on the first-pass bit rate.

In one embodiment, the computer system is associated with a social networking service.

In one embodiment, the source video is received from an account associated with the social networking service.

Many other features and embodiments of the invention will be apparent from the accompanying drawings and from the following detailed description.

Figure 1:
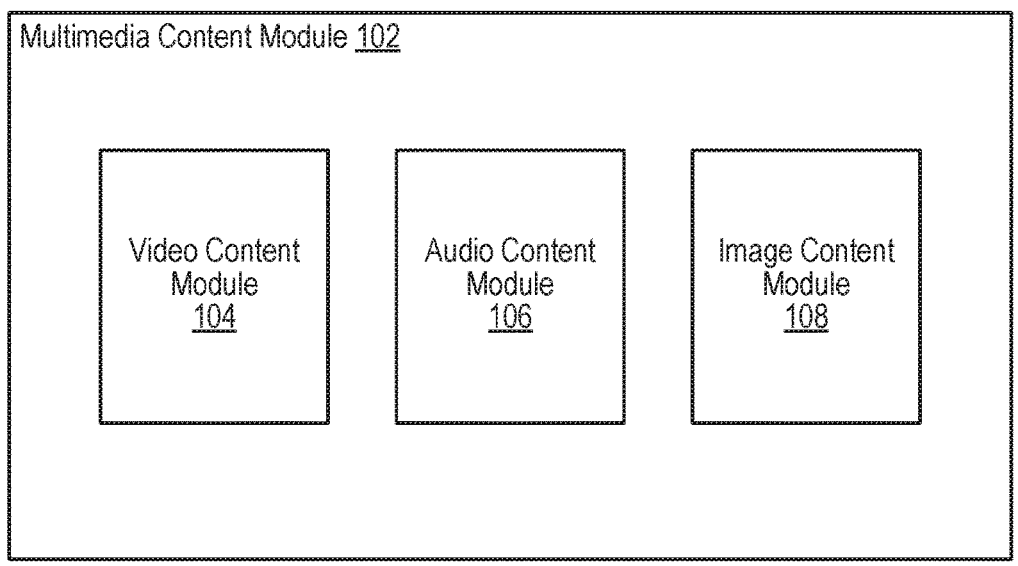
FIG. 1 illustrates an example multimedia content module configured to process or otherwise handle multimedia content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Enhanced Video Encoding

Often times people can create, edit, view, access, or otherwise utilize multimedia content, such as video content. In some cases, multimedia content can be stored and utilized in an electronic or digital format. For example, multimedia content can be stored as a data file that is playable or otherwise accessible by one or more computer systems. The multimedia data file (multimedia file) can be stored at one or more data stores to be accessed or otherwise used at a subsequent time. The stored multimedia file can use an amount of space (e.g., hard disk space) on the one or more data stores at which it is stored. In some instances, the contents of a multimedia file can affect a file size of the multimedia file. In one example, a higher quality video (e.g., with higher resolution, with better audio, etc.) can take up more space than a relatively lower quality video. In another example, a longer video (e.g., playback length) can use up more space than a shorter video. It follows that as the number and/or quality of video files increase, the space required to store the video files can also increase.

In some embodiments, a video multimedia file (video file or video) can be encoded in one or more encoding processes. In general, a video encoding process can refer to a process in which a given video is organized, prepared, and/or modified in accordance with given specifications (e.g., properties, settings, parameters, etc.). Sometimes, encoding the video can convert the video from one format to another format, or from one set of specifications to another set of specifications. This can allow the video (or an encoded version of the video) to be compatible with different devices and systems. Moreover, in some cases, encoding the video can reduce the amount of space required to store the video. As such, the process of encoding videos can enable the videos to be accessible by various devices and/or systems as well as reduce the file sizes of the videos.

In one example, a video can be encoded at a particular bit rate. In general, a bit rate of a video can indicate a quantity of data used to represent the video. It follows that a bit rate at which a video is encoded can indicate the quantity of data used to represent the encoded video. When more data is used to encode a video (e.g., when the video is encoded at a higher bit rate), the quality of the video can increase but the file size of the video increases as well. Conversely, when less data is used to encode the video (e.g., when the video is encoded at a lower bit rate), the file size of the video decreases but the quality of the video can decrease as well. Therefore, videos that have better quality can cost more space to store, but videos that require less space can have poorer quality.

Various embodiments of the present disclosure can, for a given video to be encoded, produce an encoded video that has a lesser file size than prior to being encoded, while also substantially maintaining the quality of the video. Various embodiments of the present disclosure can provide an enhanced video encoding process that produces a compressed video based on the given video, without having to significantly reduce the quality of the compressed video.

FIG. 1 illustrates an example multimedia content module 102 configured to process or otherwise handle multimedia content, according to an embodiment of the present disclosure. Multimedia content can include, but is not limited to, images, audio, video, and/or any combination thereof. The example multimedia content module 102 can comprise a video content module 104, an audio content module 106, and an image content module 108. The components shown in this figure and all figures herein are exemplary only, and other implementations may include additional, fewer, integrated, or different components. Some components may not be shown so as not to obscure relevant details.

The video content module 104 can, for example, be configured to process or otherwise handle video content that is received or acquired by the multimedia content module 102. Similarly, the audio content module 106 can be configured to process or otherwise handle audio content, and the image content module 106 can be configured to process or otherwise handle image content.

In some embodiments, when the multimedia content module 102 receives or acquires a video, the video can be directed or relayed to the video content module 104. When the multimedia content module 102 receives an audio, the audio can be directed to the audio content module 106. Likewise, when an image is received, the image can be directed to the image content module 108 to be processed or otherwise handled.

In some embodiments, the multimedia content module 102 can be associated with a social networking service, provider, and/or system. In one example, the multimedia content module 102 can work in conjunction with one or more computer systems of the social networking service. In another example, the multimedia content module 102 can be incorporated within the one or more computer systems of the social networking service. The multimedia content module 102 in relation to the social networking service will be discussed in more detail below.

Figure 2:
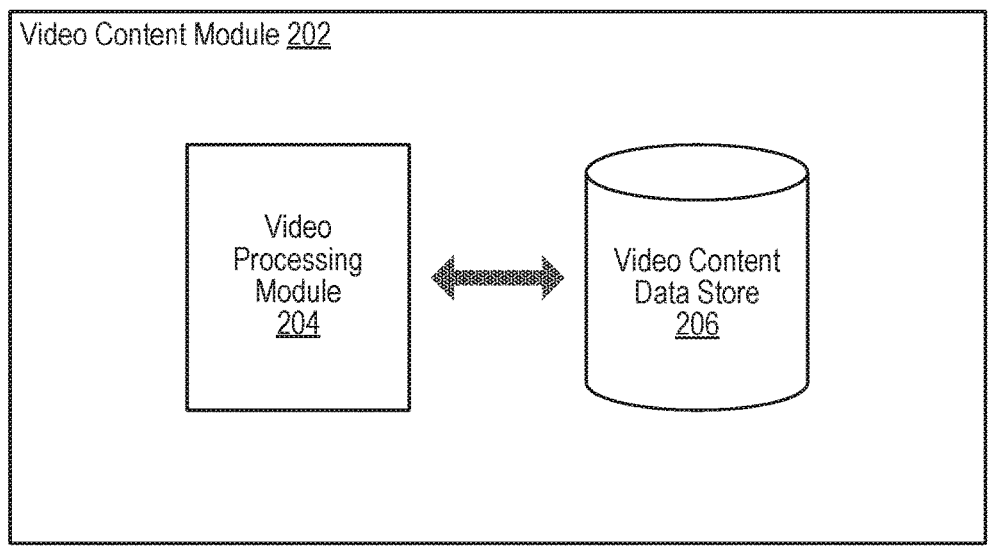
FIG. 2 illustrates an example video content module shown in FIG. 1, according to an embodiment of the present disclosure.

FIG. 2 illustrates an example video content module 202, as shown in FIG. 1 (e.g., video content module 104), according to an embodiment of the present disclosure. The example video content module 202 can comprise a video processing module 204 and a video content data store 206. The video processing module 204 can, for example, process, access, modify, or otherwise handle a given video. The video content data store 206 can store video content, such as one or more videos (i.e., video files).

In some embodiments, the video processing module 204 can be coupled or communicatively connected to the video content data store 206. This can enable the video processing module 204 and the video content data store 206 to communicate with each other. In some cases, the video processing module 204 can access one or more videos that are stored at the video content data store 206. Furthermore, in some instances, the video processing module 204 can provide one or more videos to be stored at the video content data store 206. For example, when a given video has been modified by the video processing module 204, resulting in a modified video (e.g., a modified copy of the video), the modified video can be stored at the video content data store 206.

In some cases, the video content data store 206 can be configured to store multiple versions (e.g., copies) of a given video as well as to store information about how the multiple versions of the given video are related. For example, the video content data store 206 can store an original version of a given video (e.g., an original video), a version of the given video that has been encoded at a particular bit rate, another version of the given video that has been encoded at a different bit rate, and so forth. The video content data store 206 can also hold, for example, information indicating that the two latter videos are derived from the given video.

Figure 3:
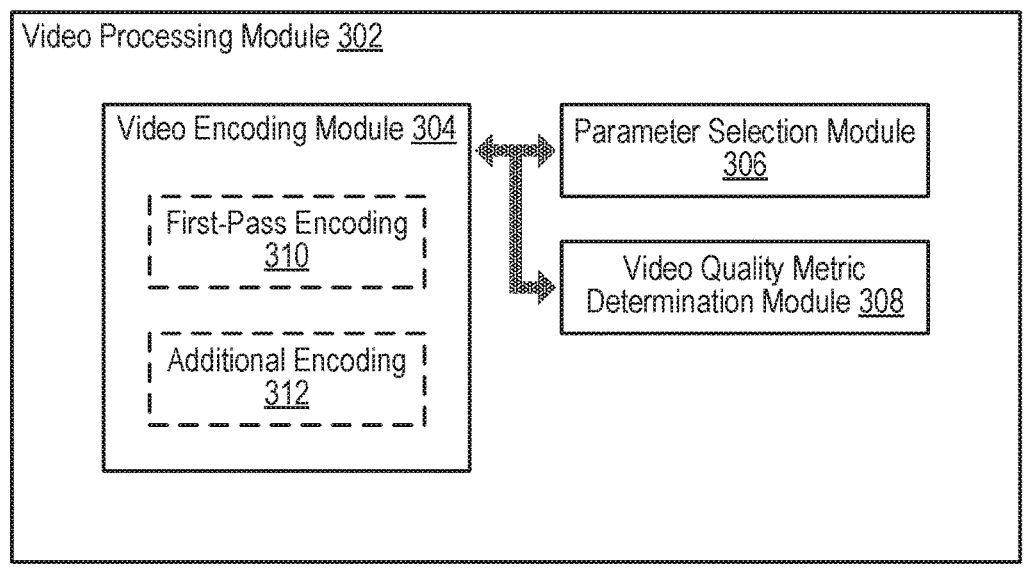
FIG. 3 illustrates an example video processing module shown in FIG. 2, according to an embodiment of the present disclosure.

FIG. 3 illustrates an example video processing module 302, as shown in FIG. 2 (e.g., video processing module 204), according to an embodiment of the present disclosure. The example video processing module 302 can comprise a video encoding module 304, a parameter selection module 306, and a video quality metric determination module 308. As shown in FIG. 3, the video encoding module 304, the parameter selection module 306, and the video quality metric determination module 308 can be configured to be capable of communicating with one another.

In some embodiments, the video encoding module 304 can be configured to facilitate applying or performing an encoding process with respect to a given video. For example, the video encoding module 304 can be utilized to encode the given video at a certain bit rate. In some cases, the bit rate at which to encode the given video can be determined or selected by the parameter selection module 306. The parameter selection module 306 will be discussed in more detail below.

In one example, the determined or selected bit rate can correspond to an average bit rate for a video to be encoded in a variable bit rate encoding process. In a variable bit rate encoding process, a video can be encoded with different bit rates at different portions of the video. As such, during variable bit rate encoding, a video encoder (e.g., video encoding module 304) can use more data to represent portions of the video that have more detail and use less data to represent video portions that have less detail. In contrast, the process of encoding a video using one bit rate throughout the entirety of the video can be referred to as constant bit rate encoding. Compared to constant bit rate encoding, variable bit rate encoding can more efficiently allocate data used to represent the video. Referring back to the example, the video encoding module 304 can receive the determined or selected bit rate (e.g., average bit rate) and attempt to "intelligently" allocate data to represent various portions of the video while still maintaining the determined or selected bit rate (e.g., average bit rate) for the video. In other words, encoding a video at a selected bit rate can comprise performing a variable bit rate encoding process with respect to the video such that the data used to represent portions of the video is appropriately distributed while the resulting average bit rate for the encoded video still matches the selected bit rate.

The video quality metric determination module 308 can be configured to determine or calculate a video quality metric. In general, the video quality metric can be used to measure a level of similarity (e.g., pixel similarity, perceived visual similarity, frame-by-frame image quality similarity, etc.) between two (or more) videos. For example, given a first video and a second video, the quality metric can be used to determine how similar the second video is to the first video. If the quality metric for the second video (relative to the first video) is higher, then the second video is likely more similar to the first video. Conversely, if the quality metric for the second video (relative to the first video) is lower, then the second video is likely less similar to the first video.

In some instances, the quality metric can include, but is not limited to, at least one of a structural similarity (SSIM) index, a multi-scale structural similarity (MS-SSIM) index, or a peak signal-to-noise ratio (PSNR), etc. A person having ordinary skill in the art would recognize that various other metrics, evaluation methods, and/or approaches for determining similarity between two videos can be implemented with various embodiments of the present disclosure.

As discussed above, various embodiments of the present disclosure can provide for enhanced video encoding. In particular, various embodiments of the present disclosure can provide an iterative video encoding process. In one example, a source video (i.e., input video) is received or otherwise acquired. A video encoding process using a selected bit rate can be applied, by the video encoding module 304, to the source video to produce an encoded video. The bit rate can be selected or determined, by the parameter selection module 306. In some cases, the bit rate can be selected such that, subsequent to being encoded at the selected bit rate, the encoded video will have a smaller file size than that of the source video.

Continuing with the previous example, the quality metric for the encoded video (relative to the source video) can be determined or calculated by the video quality metric determination module 308. If the quality metric for the encoded video (relative to the source video) is sufficiently high, then the encoded video can be considered to be sufficiently similar to the source video, even though the encoded video has a lesser file size than the source video. If, however, the quality metric for the encoded video is not sufficiently high, then the encoded video can be considered not sufficiently similar to the source video. In this case, a higher bit rate can be selected by the parameter selection module 306 and the source video can be encoded again by the video encoding module 304 using the higher bit rate. Moreover, in some embodiments, if the quality metric for the encoded video is higher than what is specified as being sufficient, then a lower bit rate can be selected and the source video can be encoded again at the lower bit rate (in order to reduce the video file size). This process of selecting a bit rate and encoding the video at the selected bit rate can repeat itself (e.g., iteratively) until an encoded video having a desire quality metric (and a desired file size) is produced.

In some embodiments, the video encoding module 304 can be configured to perform a first-pass encoding process 310 and at least one additional encoding process(es) 312. When a video is initially received or acquired by the video processing module 302 (e.g., via the video content module 202, via the multimedia content module 102, etc.), the video encoding module 304 can apply or perform the first-pass encoding process 310 to the initially received or acquired video (i.e., original video). The first-pass encoding process 310 can encode the original video at a first-pass bit rate. In some instances, the first-pass bit rate can have a default value. For example, a first-pass bit rate can have a value of 120%, 150%, etc., relative to the original video.

During the first-pass encoding process 310, the video encoding module 304 can analyze the original video and make decisions about how to use data to represent the original video. In other words, during the first-pass encoding process 310, the video encoding module 304 can make decisions (sometimes dynamically) about where to spend bits for encoding the original video. In one example, if a first portion (e.g., frame, set of frames, etc.) of the original video is a solid background, such as if the video has a black background for a few seconds, then the video encoding module 304 can decide not to use a lot of data (e.g., can decide not to waste too many bits) to represent the solid background. If, however, a second portion of the video has substantive detail (e.g., has one or more subject matters, objects of interest, etc.), then the video encoding module 304 can decide to use more data to represent this second portion of the video.

During the first-pass encoding process 310, the video encoding module 304 (or video processing module 302 or video content module 202) can obtain data about the original video. The first-pass encoding process 310 can enable the video encoding module 304 to determine how much information or detail is in the video and at which video portion(s). Continuing with the previous example, the video encoding module 304 can obtain data indicating that the first portion of the original video (as well as copies of the original video) will have less detail whereas the second portion will contain more detail. In some embodiments, the obtained data about the original video can be utilized by the video encoding module 304 when performing the at least one additional encoding process(es) 312.

In some embodiments, the at least one additional encoding process(es) 312 can be performed by the video encoding module 304 subsequent to the first-pass encoding process 310. For example, the first-pass encoding process 310 is applied to an original video to produce a first-pass encoded video. The additional encoding process(es) 312 can be applied to the first-pass encoded video. The first-pass encoded video can thus serve as an input video or a source video for the additional encoding 312. In some embodiments, the additional encoding 312 can correspond to iterative encoding.

In one example, the video encoding module 304 can receive or otherwise acquire a source video (i.e., an input video). As discussed previously, the source video can correspond to a first-pass encoded video, which has been encoded at a first-pass bit rate. The parameter selection module 306 can determine or select a bit rate at which to perform additional encoding 312 for the source video. In some instances, the bit rate can be determined based on the first-pass bit rate. In some instances, the bit rate can be determined or selected such that a video produced based on encoding at the determined bit rate would have a desired file size (e.g., less than that of the source video). Upon determining the bit rate, the video encoding module 304 can perform a first iteration of additional encoding 312 on the source video using the determined bit rate. The first iteration of additional encoding 312 can produce an encoded video.

Continuing with the example, the video quality metric determination module 308 can determine a video quality metric (e.g., SSIM index) for the encoded video. If the determined video quality metric for the encoded video is within an allowable deviation from a target quality metric, then the encoded video is considered optimal (or satisfactory) (e.g., sufficiently similar to the source video but having a desired file size) and no further iterations of additional encoding 312 are needed. If, however, the video quality metric for the encoded video is outside the allowable deviation from the target quality metric, then another bit rate is determined and another iteration of the additional encoding 312 is performed with the other determined bit rate. The process can repeat (iteratively) until the encoded video is within the allowable deviation from the target quality metric. In this example, the target quality metric can correspond to an SSIM index of 0.975. As such, when the additional (iterative) encoding 312 produces an encoded video having an SSIM index that substantially matches 0.975, then the encoded video can be considered optimal and the additional (iterative) encoding 312 can cease. In other embodiments, other target quality metrics can correspond to other SSIM index values.

Moreover, in some embodiments, each iteration in the additional encoding process 312 can utilize the obtained data about the original video. The data about the original video can specify, for example, that a first portion of the video contains less detail, a second portion of the video contains more detail, and so forth. Accordingly, the video encoding module 304 can utilize the data about the original video in attempt to efficiently distribute data used to represent various portions of the video during the additional encoding process(es) 312. For example, during additional encoding 312, the video encoding module 304 can allocate less data to encode the first portion, more data to encode the second portion, and so forth.

Figure 4:
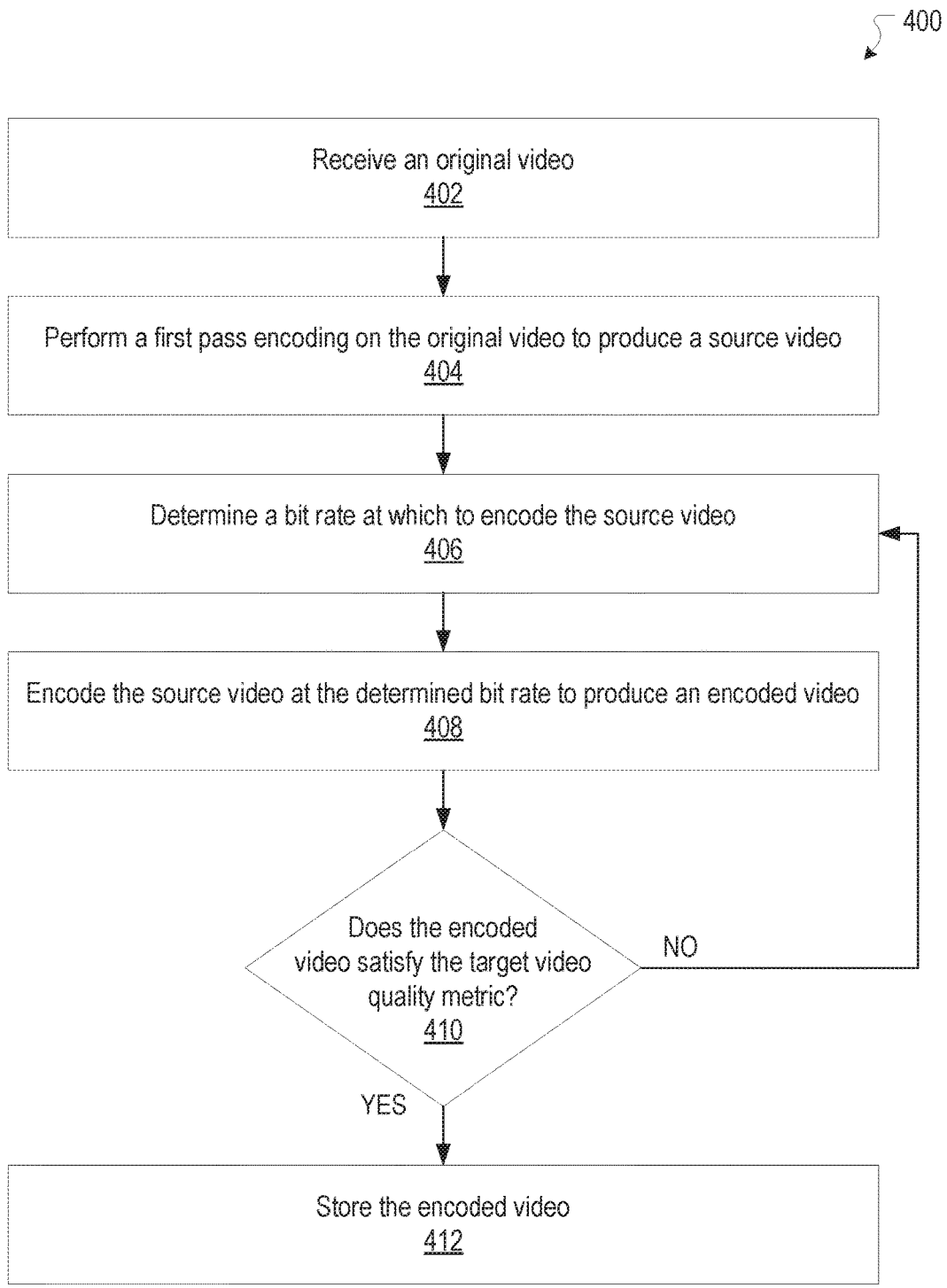
FIG. 4 illustrates an example method for iteratively encoding a video, according to an embodiment of the present disclosure.

FIG. 4 illustrates an example method 400 for iteratively encoding a video, according to an embodiment of the present disclosure. A person having ordinary skill in the art would recognize that there can be additional, fewer, or alternative steps performed in similar or alternative orders, or in parallel, within the scope of the various embodiments unless otherwise stated.

At block 402, the example method 400 can receive an original video. For example, a user can provide the original video to be received at the video processing module 302 (e.g., via the video content module 202, via the multimedia content module 102, etc.). The original video can have an original video file size. In some cases, the original video can be uncompressed.

At block 404, the example method 400 can perform a first-pass encoding on the original video. In other words, a first-pass encoding process can be applied to the original video, for example, by the video encoding module 304. During the first-pass encoding process, the original video can be encoded at a first-pass bit rate. In the example method 400, a video produced from applying the first-pass encoding process to the original video can be referred to as a source video or input video.

At block 406, the example method 400 can determine (or select) a bit rate at which to encode the source video. The bit rate can be determined (or selected) by the parameter selection module 306, which will be discussed in more detail below. The bit rate can be determined such that a video produced from encoding at the determined bit rate will have in a lesser file size than prior to the encoding.

At block 408, the source video can be encoded at the determined bit rate to produce an encoded video. The second encoding can be performed by the video encoding module 304. In this example method 400, the encoding performed at block 408 can correspond to the additional encoding process 312 discussed above.

At block 410, the example method 400 can determine whether or not the encoded video satisfies the target video quality metric. In some instances, the video quality metric determination module 308 can determine (or calculate) a video quality metric for the encoded video relative to the source video. For example, the video quality determination module 308 can determine an SSIM index for the encoded video relative to the source video. If the determined video quality metric (e.g., the SSIM index) is within an allowable deviation from the target video quality metric (e.g., an SSIM index of 0.975), then the encoded video can be deemed to satisfy the target video quality metric. Otherwise, the method 400 iterates back to block 406.

At block 412, the encoded video is deemed to satisfy the target video quality metric and can be stored, for example, at the one or more data stores (e.g., video content data store 206). In some embodiments, the encoded video can be provided in response to a subsequent media request.

Figure 5:
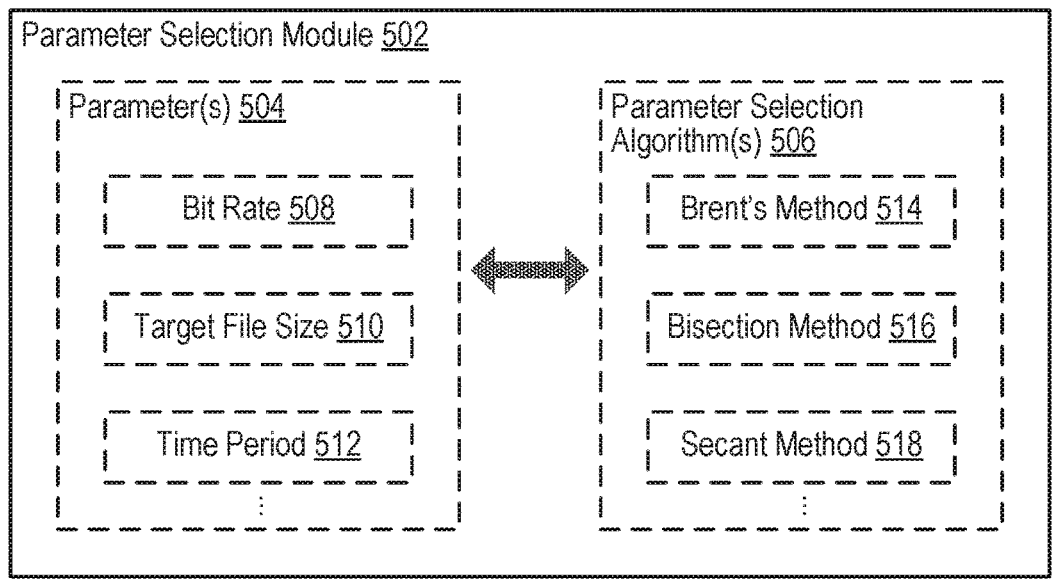
FIG. 5 illustrates an example parameter selection module shown in FIG. 3, according to an embodiment of the present disclosure.

FIG. 5 illustrates an example parameter selection module 502 shown in FIG. 3 (e.g., parameter selection module 306), according to an embodiment of the present disclosure. In general, the parameter selection module 502 can access, process, modify, or otherwise handle one or more parameters 504. As discussed above, the parameter selection module 502 can determine or select one or more parameters 504 to be used in an encoding process(es). For example, the parameter selection module 502 can select or determine a bit rate 508 at which a video is to be encoded. Other parameters 504 can include, but is not limited to, target file sizes 510, time factors 512 (e.g., time constraints) for encoding, etc.

The parameter selection module 502 can also utilize one or more parameter selection algorithms 506 to determine or select a parameter(s) 504. In some instances, at least some of the one or more parameter selection algorithms 506 can be based on a root finding algorithm. Examples of a root finding algorithm can include (but is not limited to) Brent's method 514, Newton's method (not shown in FIG. 5), a bisection method 516, a secant method 518, an interpolation method (not shown in FIG. 5), and/or any combination thereof.

In some embodiments, the parameter selection module 502 can attempt to "intelligently" determine or select the bit rates to use in iterative encoding, in order to try to reduce the number of encoding iterations required. In one example, a source video is being encoded iteratively to produce an encoded video. The source video has a source video bit rate as well as a source video file size. In a first encoding iteration of the source video, a first-iteration bit rate can be selected to be less than the source video bit rate, which can result in the first-iteration encoded video having a smaller file size than the source video. In this example, the first-iteration encoded video can be determined to have a video quality metric less than the target quality metric. As such, the parameter selection module 502 can utilize a parameter selection algorithm 506 such as Brent's method 514 to take as input the source video bit rate and the first-iteration bit rate, and then determine a bit rate to use for a second iteration of encoding. As such, Brent's method 514 can determine (or select) a second-iteration bit rate that is higher than the first-iteration bit rate but lower than the source video bit rate.

Continuing with the example, if the second encoding iteration at the second-iteration bit rate produces a second-iteration encoded video having a quality metric higher than the target quality metric, then the encoding can repeat again using a selected third-iteration bit rate. Brent's method 514 can select the third-iteration bit rate to be higher than the first-iteration bit rate but lower than the second-iteration bit rate. In this example, the encoded video resulting from the third iteration can have video quality metric that satisfies (e.g., substantially matches) the target quality metric, and the iterative encoding is thus completed. However, if the quality metric for the third-iteration encoded video does not satisfy the target quality metric, then the encoding process can iterate again, such as with a fourth encoding iteration using a determined fourth-iteration bit rate.

As discussed in the previous example, bit rates 508 can be selected or set by the parameter selection module 502. However, in some cases, a parameter 504 can be set at a default value. Moreover, in some instances, a value for a parameter 504 can be specified by a given video (e.g., a video to be encoded), such as by the metadata for the video. Furthermore, in some instances, a value for a parameter 504 can be specified by a computer system, such as a system that uploads an original video or a system of a social networking service that receives an original video.

It should be understood that the parameters 504 and algorithms 506 in FIG. 5 are shown for illustrative purposes. There can be various other parameters, algorithms, etc., that can be implemented consistent with the disclosed technology. For example, other parameters can include an expected client device buffer size, a number of different types of frames that can be used during encoding, an amount of time that can be spent for encoding, etc.

Figure 6:
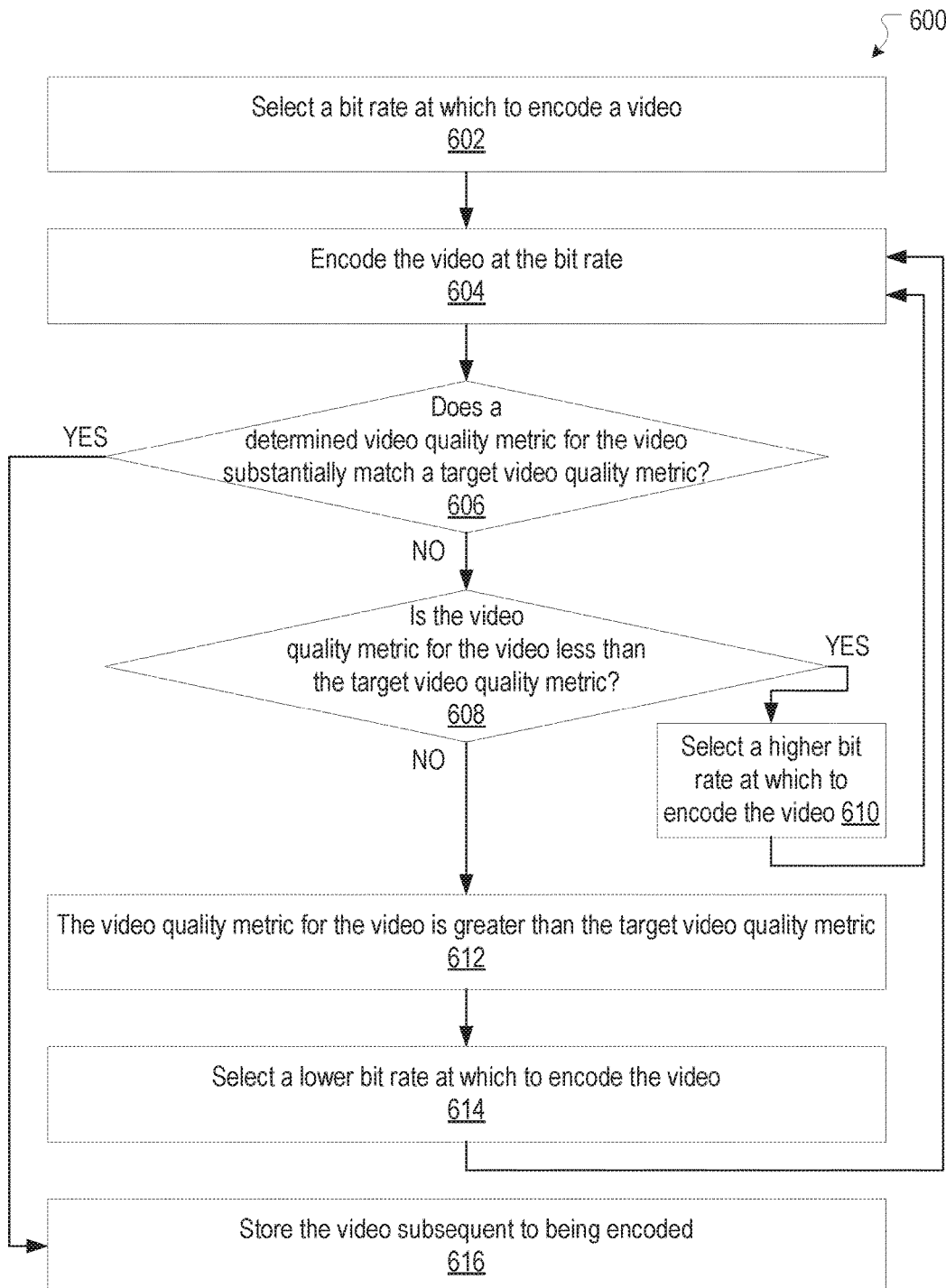
FIG. 6 illustrates an example method for iteratively encoding a video, according to an embodiment of the present disclosure.

FIG. 6 illustrates an example method 600 for iteratively encoding a video, according to an embodiment of the present disclosure. As mentioned previously, it should be understood that there can be additional, fewer, or alternative steps performed in similar or alternative orders, or in parallel, within the scope of the various embodiments unless otherwise stated.

At block 602, the example method 600 can select a bit rate at which to encode a video. The bit rate can be selected (i.e., determined), for example, by the parameter selection module (e.g., 502). The video can then be encoded at the selected bit rate, at block 604, by the video encoding module (e.g., 304).

At block 606, the example method 600 can check whether or not a determined video quality metric for the video, subsequent to being encoded at the selected bit rate, substantially matches a target quality metric (i.e., matches a target quality metric within an allowable deviation). For example, the method 600 can determine an SSIM index for the encoded video relative to the video prior to being encoded. If the SSIM index for the encoded video matches a target SSIM index of 0.975 (within an allowable deviation), then the encoded video can be considered optimized and the encoded video can be stored, at block 616. In other embodiments, any suitable target SSIM index value, other than the target SSIM index value of 0.975, can be used.

If, however, the video quality metric for the encoded video does not substantially match the target quality metric, then the example method 600 can check whether or not the video quality metric for the encoded video is less than the target video quality metric, at block 608. If so, the method 600 can select a higher bit rate at which to encode the video (block 610) and the method 600 can iterate back to block 604, where the video is encoded again at the selected (higher) bit rate. If, however, the method 600 determines that the video quality metric for the video is not less than the target quality metric, then the video quality metric for the video must be greater than the target quality metric, as shown in block 612. As such, the method 600 can select a lower bit rate at which to encode the video (block 614) and the method 600 can iterate back to block 604, at which the video is encoded again at the selected (lower) bit rate. This iterative process can continue until the video quality metric for the encoded video substantially matches or satisfies the target quality metric.

Figure 7:
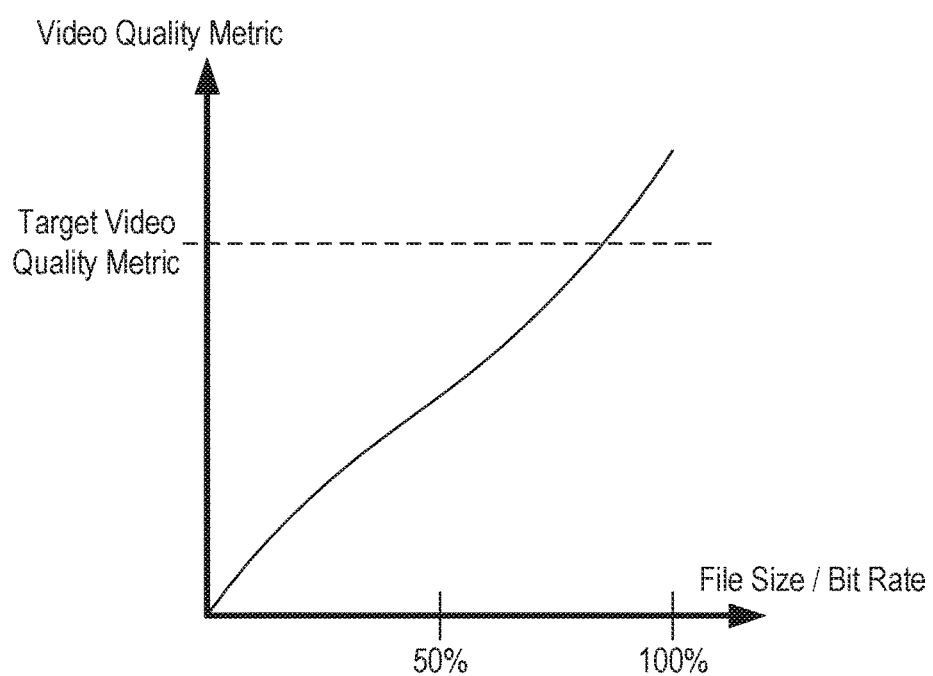
FIG. 7 illustrates an example data plot showing a relationship between a video quality metric of an example video and a file size or bit rate of the example video.

FIG. 7 illustrates an example data plot 700 showing a relationship between a video quality metric of an example video and a file size or bit rate of the example video. A person having ordinary skill in the art would recognize that the example data plot 700 may only be an approximation of the relevant data, may not be drawn to scale, and is shown for illustrative purposes only.

The example data plot 700 can indicate that, in general, as a bit rate and/or file size of an example encoded video increases, the video quality metric for the encoded video (relative to a source or input video from which the encoded video was produced) can increase as well. Moreover, the example data plot 700 indicates that an iterative encoding process applied to a source video can produce an encoded video that meets a target video quality metric while still having a file size that is less than that of the source video. The encoded video that meets the target video quality metric can be considered optimized.

In some implementations, the target video quality metric can be determined or set based on testing, research, experimentation, and/or observation. In one example, the target video quality metric can correspond to an SSIM index of 0.975. Based on testing, research, experimentation, etc., it has been observed that when a video has an SSIM index of 0.975 relative to another video, the two videos are deemed to be sufficiently similar in quality. It should be appreciated that the target SSIM index of 0.975 described herein is for illustrative purposes and that a person having ordinary skill in the art would recognize many other variations with respect to the target quality metric.

In one example, a source video can (approximately) have a bit rate (e.g., average bit rate) of 4000 kilobits per second (kbps) and a file size of 500 Megabytes (MB). An encoded video, resulting from the iterative encoding process being applied to the source video, can have a video quality metric that satisfies the target video quality metric (e.g., an SSIM index of 0.975). The encoded video can (approximately) have a bit rate of 3200 kbps and a file size of 400 MB. For other suitable target video quality metrics, other examples may reflect other values for bit rates and file sizes for source videos and associated encoded videos.

Figure 8:
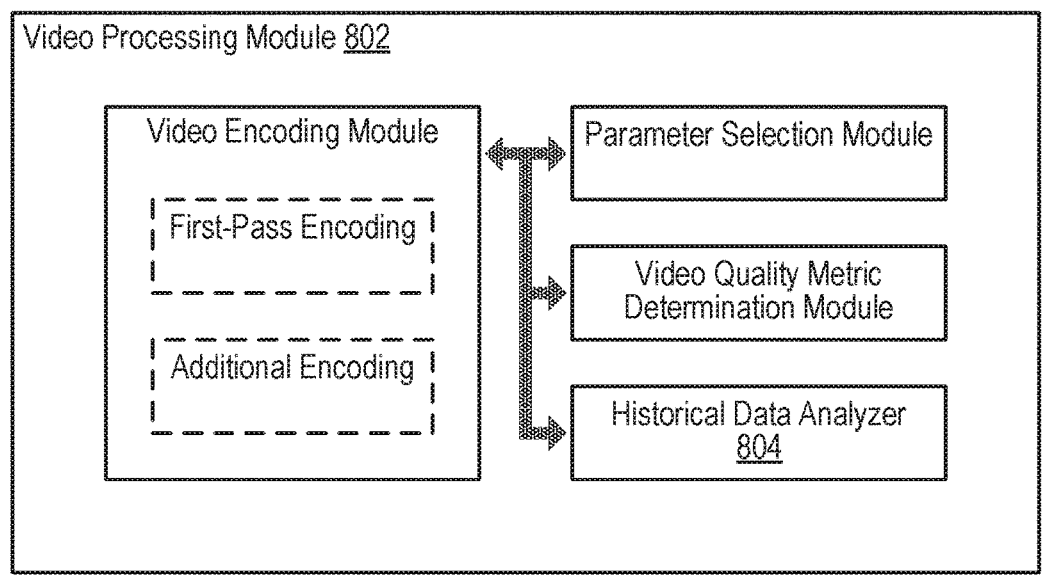
FIG. 8 illustrates an example video processing module, as shown in FIG. 2, configured to utilize historical data, according to an embodiment of the present disclosure.

FIG. 8 illustrates an example video processing module 802, as shown in FIG. 2 (e.g., video processing module 204), configured to utilize historical data, according to an embodiment of the present disclosure. In some embodiments, the example video processing module 802 can comprise a historical data analyzer 804. The video processing module 802 can utilize the historical data analyzer 804 to facilitate in further improving the performance of the enhanced video encoding described herein (e.g., iterative video encoding).

The historical data analyze 804 can receive, acquire, or otherwise access historical data about one or more videos. Historical data about videos can include, but is not limited to, information about previously acquired and/or processed videos.

In one example, an original video is received by the video processing module 802 and a first-pass encoding process is performed with respect to the original video to produce a source file. Historical data can include information about the first-pass encoding process, such as the first-pass bit rate used in the first-pass encoding and/or the levels of detail at various portions of the original video observed during the first-pass encoding. The video processing module 802 can utilize the historical data including the first-pass bit rate to determine or select another bit rate to use for additional (e.g., iterative) encoding. The video processing module 802 can also utilize the historical data including the levels of detail throughout the original video during the encoding process(es).

In another example, the video processing module 802 can have already produced an optimized video from the iterative encoding process. In this example, historical data can include the bit rate used for the optimized video. Accordingly, when the video processing module 802 has to encode a subsequent video (e.g., similar to the optimized video), then the video processing module 802 can determine or select a bit rate for the subsequent video based on the historical data including the bit rate used for the optimized video. In some cases, this can reduce the number of encoding iterations required.

Figure 9:
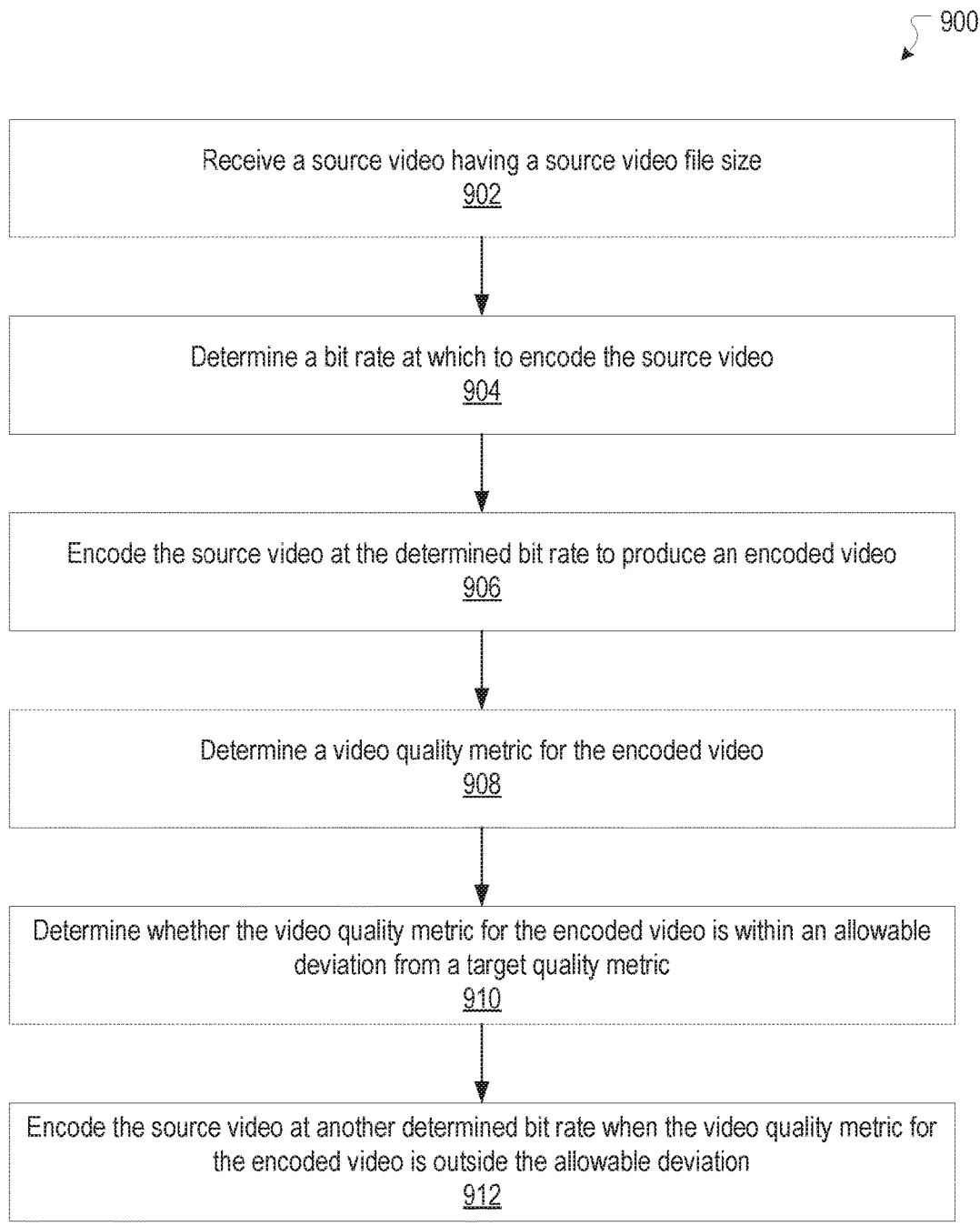
FIG. 9 illustrates an example method for enhanced video encoding, according to an embodiment of the present disclosure.

FIG. 9 illustrates an example method 900 for enhanced video encoding, according to an embodiment of the present disclosure. Again, it should be appreciated that there can be additional, fewer, or alternative steps performed in similar or alternative orders, or in parallel, within the scope of the various embodiments unless otherwise stated.

At block 902, the example method 900 can receive or acquire a source video having a source video file size. In some cases, the source video can be a product or result of a first-pass encoding applied to an original video.

At block 904, the example method 900 can determine or select a bit rate at which to encode the source video. In some embodiments, the parameter selection module (e.g., 506) can perform the determining or selecting of the bit rate such that the video resulting from being encoded at the determined bit rate will have a file size less than the source video file size.

At block 906, the example method 900 can encode the source video at the determined (or selected) bit rate to produce an encoded video. In other words, the method 900 can produce an encoded version (e.g., an encoded copy) of the source video without altering the source video, the encoded version being encoded using the determined bit rate. Accordingly, the encoded video (e.g., the encoded version or copy of the source video) is encoded at the determined bit rate and has a smaller file size than the source video file size of the source video.

At block 908, the example method 900 can determine a video quality metric for the encoded video. For example, the video quality metric determination module 308 can determine or calculate an SSIM index for the encoded video (relative to the source video). At block 910, the method 900 can determine whether or not the video quality metric for the encoded video is within an allowable deviation from a target quality metric. For example, the method 900 can determine whether or not the SSIM index for the encoded video (relative to the source video) substantially matches a target SSIM index of 0.975.

At block 912, the example method 900 can encode the source video at another determined bit rate when the video quality metric for the encoded video is outside the allowable deviation from the target quality metric (i.e., when the video quality metric for the encoded video does not substantially match the target quality metric). The determination of the other bit rate and the encoding of the video at the other determined bit rate can repeat iteratively until the determined video quality metric for the encoded video is within the allowable deviation from the target quality metric (i.e., until the video quality metric for the encoded video substantially matches the target quality metric).

Furthermore, in some cases, various embodiments of the present disclosure can be applied to other multimedia content as well. In one example, audio content (including one or more audio portions of a video) can be iteratively encoded to produce encoded audio content that requires less resources but still substantially maintains quality.

It is further contemplated that there can be many other uses, applications, and/or variations associated with the various embodiments of the present disclosure that a person of ordinary skill in the art would recognize.

Social Networking System—Example Implementation

Figure 10:
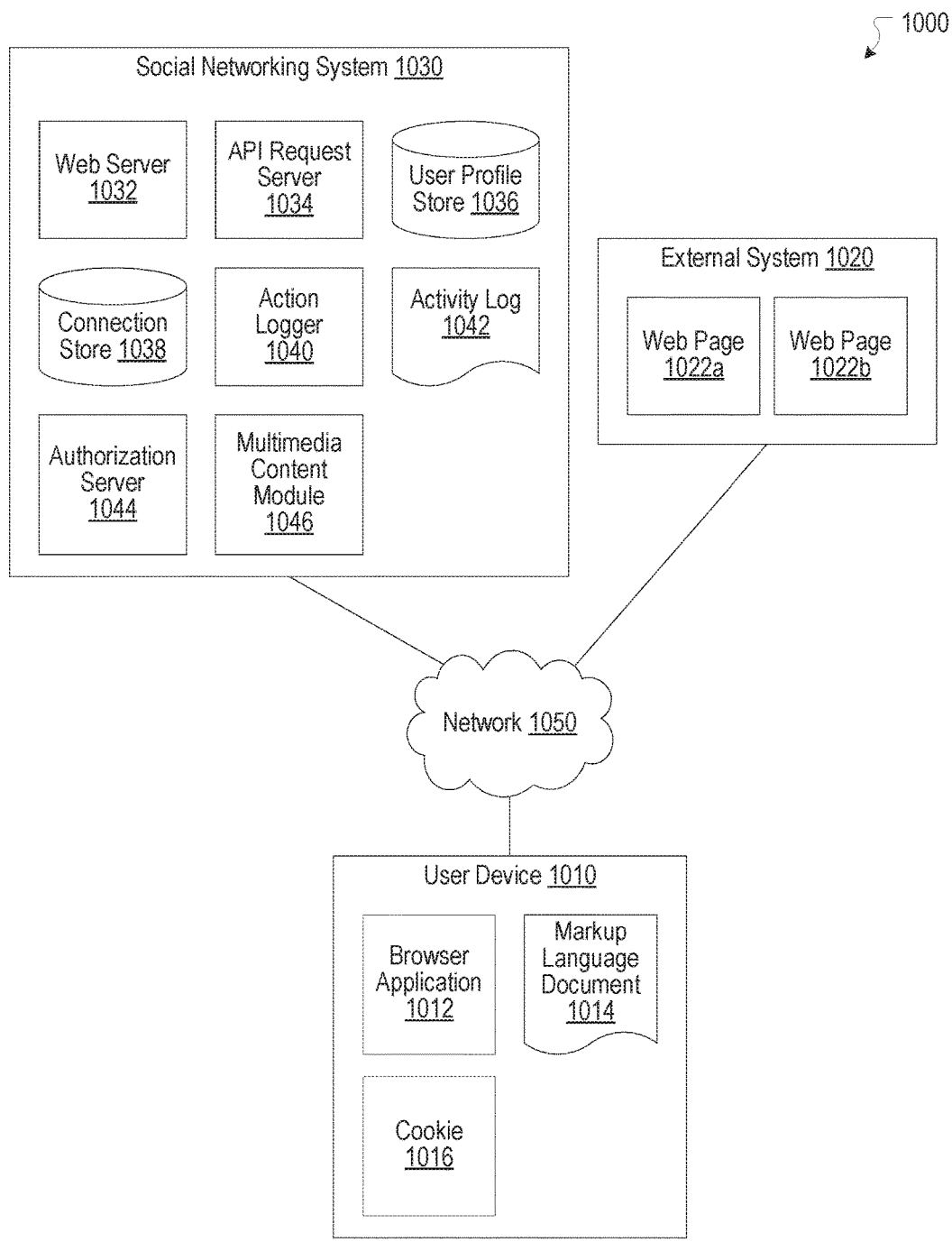
FIG. 10 illustrates a network diagram of an example system that can be utilized in various embodiments for enhanced video encoding, according to an embodiment of the present disclosure.

FIG. 10 illustrates a network diagram of an example system 1000 that can be utilized in various embodiments for enhanced video encoding, in accordance with an embodiment of the present disclosure. The system 1000 includes one or more user devices 1010, one or more external systems 1020, a social networking system 1030, and a network 1050. In an embodiment, the social networking service, provider, and/or system discussed in connection with the embodiments described above may be implemented as the social networking system 1030. For purposes of illustration, the embodiment of the system 1000, shown by FIG. 10, includes a single external system 1020 and a single user device 1010. However, in other embodiments, the system 1000 may include more user devices 1010 and/or more external systems 1020. In certain embodiments, the social networking system 1030 is operated by a social network provider, whereas the external systems 1020 are separate from the social networking system 1030 in that they may be operated by different entities. In various embodiments, however, the social networking system 1030 and the external systems 1020 operate in conjunction to provide social networking services to users (or members) of the social networking system 1030. In this sense, the social networking system 1030 provides a platform or backbone, which other systems, such as external systems 1020, may use to provide social networking services and functionalities to users across the Internet.

The user device 1010 comprises one or more computing devices that can receive input from a user and transmit and receive data via the network 1050. In one embodiment, the user device 1010 is a conventional computer system executing, for example, a Microsoft Windows compatible operating system (OS), Apple OS X, and/or a Linux distribution. In another embodiment, the user device 1010 can be a device having computer functionality, such as a smart-phone, a tablet, a personal digital assistant (PDA), a mobile telephone, etc. The user device 1010 is configured to communicate via the network 1050. The user device 1010 can execute an application, for example, a browser application that allows a user of the user device 1010 to interact with the social networking system 1030. In another embodiment, the user device 1010 interacts with the social networking system 1030 through an application programming interface (API) provided by the native operating system of the user device 1010, such as iOS and ANDROID. The user device 1010 is configured to communicate with the external system 1020 and the social networking system 1030 via the network 1050, which may comprise any combination of local area and/or wide area networks, using wired and/or wireless communication systems.

In one embodiment, the network 1050 uses standard communications technologies and protocols. Thus, the network 1050 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 1050 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1050 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1010 may display content from the external system 1020 and/or from the social networking system 1030 by processing a markup language document 1014 received from the external system 1020 and from the social networking system 1030 using a browser application 1012. The markup language document 1014 identifies content and one or more instructions describing formatting or presentation of the content. By executing the instructions included in the markup language document 1014, the browser application 1012 displays the identified content using the format or presentation described by the markup language document 1014. For example, the markup language document 1014 includes instructions for generating and displaying a web page having multiple frames that include text and/or image data retrieved from the external system 1020 and the social networking system 1030. In various embodiments, the markup language document 1014 comprises a data file including extensible markup language (XML) data, extensible hypertext markup language (XHTML) data, or other markup language data. Additionally, the markup language document 1014 may include JavaScript Object Notation (JSON) data, JSON with padding (JSONP), and JavaScript data to facilitate data-interchange between the external system 1020 and the user device 1010. The browser application 1012 on the user device 1010 may use a JavaScript compiler to decode the markup language document 1014.

The markup language document 1014 may also include, or link to, applications or application frameworks such as FLASH™ or Unity™ applications, the SilverLight™ application framework, etc.

In one embodiment, the user device 1010 also includes one or more cookies 1016 including data indicating whether a user of the user device 1010 is logged into the social networking system 1030, which may enable modification of the data communicated from the social networking system 1030 to the user device 1010.

The external system 1020 includes one or more web servers that include one or more web pages 1022a, 1022b, which are communicated to the user device 1010 using the network 1050. The external system 1020 is separate from the social networking system 1030. For example, the external system 1020 is associated with a first domain, while the social networking system 1030 is associated with a separate social networking domain. Web pages 1022a, 1022b, included in the external system 1020, comprise markup language documents 1014 identifying content and including instructions specifying formatting or presentation of the identified content.

The social networking system 1030 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1030 may be administered, managed, or controlled by an operator. The operator of the social networking system 1030 may be a human being, an automated application, or a series of applications for managing content, regulating policies, and collecting usage metrics within the social networking system 1030. Any type of operator may be used.

Users may join the social networking system 1030 and then add connections to any number of other users of the social networking system 1030 to whom they desire to be connected. As used herein, the term "friend" refers to any other user of the social networking system 1030 to whom a user has formed a connection, association, or relationship via the social networking system 1030. For example, in an embodiment, if users in the social networking system 1030 are represented as nodes in the social graph, the term "friend" can refer to an edge formed between and directly connecting two user nodes.

Connections may be added explicitly by a user or may be automatically created by the social networking system 1030 based on common characteristics of the users (e.g., users who are alumni of the same educational institution). For example, a first user specifically selects a particular other user to be a friend. Connections in the social networking system 1030 are usually in both directions, but need not be, so the terms "user" and "friend" depend on the frame of reference. Connections between users of the social networking system 1030 are usually bilateral ("two-way"), or "mutual," but connections may also be unilateral, or "one-way." For example, if Bob and Joe are both users of the social networking system 1030 and connected to each other, Bob and Joe are each other's connections. If, on the other hand, Bob wishes to connect to Joe to view data communicated to the social networking system 1030 by Joe, but Joe does not wish to form a mutual connection, a unilateral connection may be established. The connection between users may be a direct connection; however, some embodiments of the social networking system 1030 allow the connection to be indirect via one or more levels of connections or degrees of separation.

In addition to establishing and maintaining connections between users and allowing interactions between users, the social networking system 1030 provides users with the ability to take actions on various types of items supported by the social networking system 1030. These items may include groups or networks (i.e., social networks of people, entities, and concepts) to which users of the social networking system 1030 may belong, events or calendar entries in which a user might be interested, computer-based applications that a user may use via the social networking system 1030, transactions that allow users to buy or sell items via services provided by or through the social networking system 1030, and interactions with advertisements that a user may perform on or off the social networking system 1030. These are just a few examples of the items upon which a user may act on the social networking system 1030, and many others are possible. A user may interact with anything that is capable of being represented in the social networking system 1030 or in the external system 1020, separate from the social networking system 1030, or coupled to the social networking system 1030 via the network 1050.

The social networking system 1030 is also capable of linking a variety of entities. For example, the social networking system 1030 enables users to interact with each other as well as external systems 1020 or other entities through an API, a web service, or other communication channels. The social networking system 1030 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1030. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1030 modifies edges connecting the various nodes to reflect the relationships and interactions.

The social networking system 1030 also includes user-generated content, which enhances a user's interactions with the social networking system 1030. User-generated content may include anything a user can add, upload, send, or "post" to the social networking system 1030. For example, a user communicates posts to the social networking system 1030 from a user device 1010. Posts may include data such as status updates or other textual data, location information, images such as photos, videos, links, music or other similar data and/or media. Content may also be added to the social networking system 1030 by a third party. Content "items" are represented as objects in the social networking system 1030. In this way, users of the social networking system 1030 are encouraged to communicate with each other by posting text and content items of various types of media through various communication channels. Such communication increases the interaction of users with each other and increases the frequency with which users interact with the social networking system 1030.

The social networking system 1030 includes a web server 1032, an API request server 1034, a user profile store 1036, a connection store 1038, an action logger 1040, an activity log 1042, an authorization server 1044, and an image importing module 1046. In an embodiment of the invention, the social networking system 1030 may include additional, fewer, or different components for various applications. Other components, such as network interfaces, security mechanisms, load balancers, failover servers, management and network operations consoles, and the like are not shown so as to not obscure the details of the system.

The user profile store 1036 maintains information about user accounts, including biographic, demographic, and other types of descriptive information, such as work experience, educational history, hobbies or preferences, location, and the like that has been declared by users or inferred by the social networking system 1030. This information is stored in the user profile store 1036 such that each user is uniquely identified. The social networking system 1030 also stores data describing one or more connections between different users in the connection store 1038. The connection information may indicate users who have similar or common work experience, group memberships, hobbies, or educational history. Additionally, the social networking system 1030 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1030, such as non-person entities, buckets, cluster centers, images, interests, pages, external systems, concepts, and the like are also stored in the connection store 1038.

The social networking system 1030 maintains data about objects with which a user may interact. To maintain this data, the user profile store 1036 and the connection store 1038 store instances of the corresponding type of objects maintained by the social networking system 1030. Each object type has information fields that are suitable for storing information appropriate to the type of object. For example, the user profile store 1036 contains data structures with fields suitable for describing a user's account and information related to a user's account. When a new object of a particular type is created, the social networking system 1030 initializes a new data structure of the corresponding type, assigns a unique object identifier to it, and begins to add data to the object as needed. This might occur, for example, when a user becomes a user of the social networking system 1030, the social networking system 1030 generates a new instance of a user profile in the user profile store 1036, assigns a unique identifier to the user account, and begins to populate the fields of the user account with information provided by the user.

The connection store 1038 includes data structures suitable for describing a user's connections to other users, connections to external systems 1020 or connections to other entities. The connection store 1038 may also associate a connection type with a user's connections, which may be used in conjunction with the user's privacy setting to regulate access to information about the user. In an embodiment of the invention, the user profile store 1036 and the connection store 1038 may be implemented as a federated database.

Data stored in the connection store 1038, the user profile store 1036, and the activity log 1042 enables the social networking system 1030 to generate the social graph that uses nodes to identify various objects and edges connecting nodes to identify relationships between different objects. For example, if a first user establishes a connection with a second user in the social networking system 1030, user accounts of the first user and the second user from the user profile store 1036 may act as nodes in the social graph. The connection between the first user and the second user stored by the connection store 1038 is an edge between the nodes associated with the first user and the second user. Continuing this example, the second user may then send the first user a message within the social networking system 1030. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1030 (or, alternatively, in an image maintained by another system outside of the social networking system 1030). The image may itself be represented as a node in the social networking system 1030. This tagging action may create edges between the first user and the second user as well as create an edge between each of the users and the image, which is also a node in the social graph. In yet another example, if a user confirms attending an event, the user and the event are nodes obtained from the user profile store 1036, where the attendance of the event is an edge between the nodes that may be retrieved from the activity log 1042. By generating and maintaining the social graph, the social networking system 1030 includes data describing many different types of objects and the interactions and connections among those objects, providing a rich source of socially relevant information.

The web server 1032 links the social networking system 1030 to one or more user devices 1010 and/or one or more external systems 1020 via the network 1050. The web server 1032 serves web pages, as well as other web-related content, such as Java, JavaScript, Flash, XML, and so forth. The web server 1032 may include a mail server or other messaging functionality for receiving and routing messages between the social networking system 1030 and one or more user devices 1010. The messages can be instant messages, queued messages (e.g., email), text and SMS messages, or any other suitable messaging format.

The API request server 1034 allows one or more external systems 1020 and user devices 1010 to call access information from the social networking system 1030 by calling one or more API functions. The API request server 1034 may also allow external systems 1020 to send information to the social networking system 1030 by calling APIs. The external system 1020, in one embodiment, sends an API request to the social networking system 1030 via the network 1050, and the API request server 1034 receives the API request. The API request server 1034 processes the request by calling an API associated with the API request to generate an appropriate response, which the API request server 1034 communicates to the external system 1020 via the network 1050. For example, responsive to an API request, the API request server 1034 collects data associated with a user, such as the user's connections that have logged into the external system 1020, and communicates the collected data to the external system 1020. In another embodiment, the user device 1010 communicates with the social networking system 1030 via APIs in the same manner as external systems 1020.

The action logger 1040 is capable of receiving communications from the web server 1032 about user actions on and/or off the social networking system 1030. The action logger 1040 populates the activity log 1042 with information about user actions, enabling the social networking system 1030 to discover various actions taken by its users within the social networking system 1030 and outside of the social networking system 1030. Any action that a particular user takes with respect to another node on the social networking system 1030 may be associated with each user's account, through information maintained in the activity log 1042 or in a similar database or other data repository. Examples of actions taken by a user within the social networking system 1030 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1030, the action is recorded in the activity log 1042. In one embodiment, the social networking system 1030 maintains the activity log 1042 as a database of entries. When an action is taken within the social networking system 1030, an entry for the action is added to the activity log 1042. The activity log 1042 may be referred to as an action log.

Additionally, user actions may be associated with concepts and actions that occur within an entity outside of the social networking system 1030, such as an external system 1020 that is separate from the social networking system 1030. For example, the action logger 1040 may receive data describing a user's interaction with an external system 1020 from the web server 1032. In this example, the external system 1020 reports a user's interaction according to structured actions and objects in the social graph.

Other examples of actions where a user interacts with an external system 1020 include a user expressing an interest in an external system 1020 or another entity, a user posting a comment to the social networking system 1030 that discusses an external system 1020 or a web page 1022*a* within the external system 1020, a user posting to the social networking system 1030 a Uniform Resource Locator (URL) or other identifier associated with an external system 1020, a user attending an event associated with an external system 1020, or any other action by a user that is related to an external system 1020. Thus, the activity log 1042 may include actions describing interactions between a user of the social networking system 1030 and an external system 1020 that is separate from the social networking system 1030.

The authorization server 1044 enforces one or more privacy settings of the users of the social networking system 1030. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1020, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1020. One embodiment allows the specification of the set of entities to comprise an enumeration of entities. For example, the user may provide a list of external systems 1020 that are allowed to access certain information. Another embodiment allows the specification to comprise a set of entities along with exceptions that are not allowed to access the information. For example, a user may allow all external systems 1020 to access the user's work information, but specify a list of external systems 1020 that are not allowed to access the work information. Certain embodiments call the list of exceptions that are not allowed to access certain information a "block list". External systems 1020 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1044 contains logic to determine if certain information associated with a user can be accessed by a user's friends, external systems 1020, and/or other applications and entities. The external system 1020 may need authorization from the authorization server 1044 to access the user's more private and sensitive information, such as the user's work phone number. Based on the user's privacy settings, the authorization server 1044 determines if another user, the external system 1020, an application, or another entity is allowed to access information associated with the user, including information about actions taken by the user.

The social networking system 1030 can include a multimedia content module 1046. The multimedia content module 1046 can communicate with the user device 1010 to upload multimedia content, such as one or more images, audios, and/or videos, from the user device 1010 to the social networking system 1030. For example, the multimedia content module 1046 can receive a video uploaded from the user device 1010 to the social networking system 1030. The multimedia content module 1046 can process or otherwise handle the video received from the user device 1010. In an embodiment, the enhanced video encoding techniques (e.g., iterative video encoding techniques) described herein can be performed by the multimedia content module 1046 (or by at least a portion thereof). For example, the multimedia content module 1046 included with the social networking system 1030 can facilitate in iteratively encoding the received video to produce an encoded video that is similar in quality to the received video but has a lesser file size. As a result, the amount of social networking system resources required by the encoded video is reduced, but the user experience of uploading and accessing videos at the social networking system 1030 is substantially maintained. In an embodiment, the multimedia content module 1046 may be implemented as the multimedia content module 102.

Hardware Implementation

Figure 11:
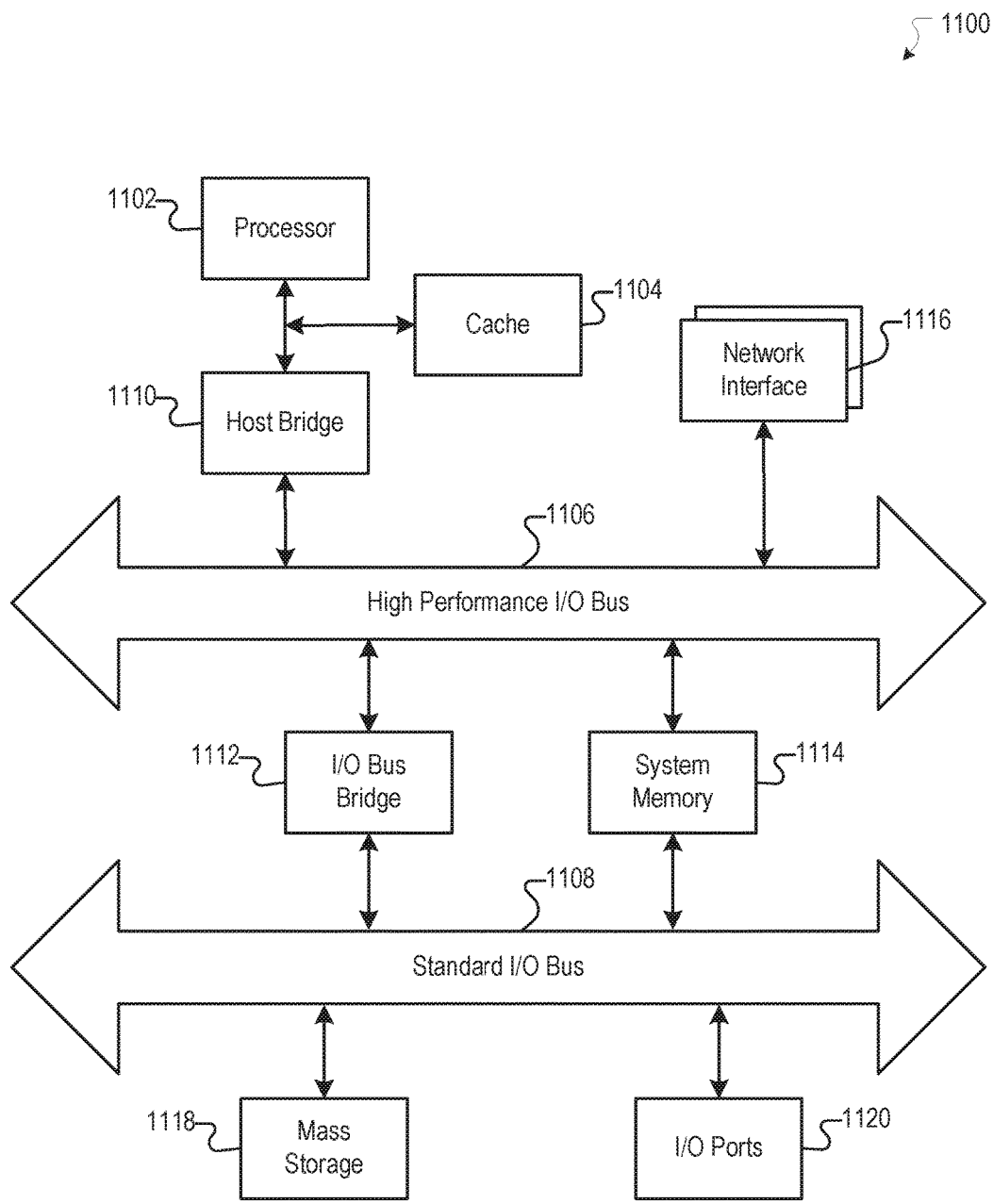
FIG. 11 illustrates an example of a computer system that can be used to implement one or more of the embodiments described herein, according to an embodiment of the present disclosure.

The foregoing processes and features can be implemented by a wide variety of machine and computer system architectures and in a wide variety of network and computing environments. FIG. 11 illustrates an example of a computer system 1100 that may be used to implement one or more of the embodiments described herein in accordance with an embodiment of the invention. The computer system 1100 includes sets of instructions for causing the computer system 1100 to perform the processes and features discussed herein. The computer system 1100 may be connected (e.g., networked) to other machines. In a networked deployment, the computer system 1100 may operate in the capacity of a server machine or a client machine in a client-server network environment, or as a peer machine in a peer-to-peer (or distributed) network environment. In an embodiment of the invention, the computer system 1100 may be the social networking system 1030, the user device 1010, and the external system 1020, or a component thereof. In an embodiment of the invention, the computer system 1100 may be one server among many that constitutes all or part of the social networking system 1030.

The computer system 1100 includes a processor 1102, a cache 1104, and one or more executable modules and drivers, stored on a computer-readable medium, directed to the processes and features described herein. Additionally, the computer system 1100 includes a high performance input/output (I/O) bus 1106 and a standard I/O bus 1108. A host bridge 1110 couples processor 1102 to high performance I/O bus 1106, whereas I/O bus bridge 1112 couples the two buses 1106 and 1108 to each other. A system memory 1114 and one or more network interfaces 1116 couple to high performance I/O bus 1106. The computer system 1100 may further include video memory and a display device coupled to the video memory (not shown). Mass storage 1118 and I/O ports 1120 couple to the standard I/O bus 1108. The computer system 1100 may optionally include a keyboard and pointing device, a display device, or other input/output devices (not shown) coupled to the standard I/O bus 1108. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1100 are described in greater detail below. In particular, the network interface 1116 provides communication between the computer system 1100 and any of a wide range of networks, such as an Ethernet (e.g., IEEE 802.3) network, a backplane, etc. The mass storage 1118 provides permanent storage for the data and programming instructions to perform the above-described processes and features implemented by the respective computing systems identified above, whereas the system memory 1114 (e.g., DRAM) provides temporary storage for the data and programming instructions when executed by the processor 1102. The I/O ports 1120 may be one or more serial and/or parallel communication ports that provide communication between additional peripheral devices, which may be coupled to the computer system 1100.

The computer system 1100 may include a variety of system architectures, and various components of the computer system 1100 may be rearranged. For example, the cache 1104 may be on-chip with processor 1102. Alternatively, the cache 1104 and the processor 1102 may be packed together as a "processor module", with processor 1102 being referred to as the "processor core". Furthermore, certain embodiments of the invention may neither require nor include all of the above components. For example, peripheral devices coupled to the standard I/O bus 1108 may couple to the high performance I/O bus 1106. In addition, in some embodiments, only a single bus may exist, with the components of the computer system 1100 being coupled to the single bus. Furthermore, the computer system 1100 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1100 that, when read and executed by one or more processors, cause the computer system 1100 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1100, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1102. Initially, the series of instructions may be stored on a storage device, such as the mass storage 1118. However, the series of instructions can be stored on any suitable computer readable storage medium. Furthermore, the series of instructions need not be stored locally, and could be received from a remote storage device, such as a server on a network, via the network interface 1116. The instructions are copied from the storage device, such as the mass storage 1118, into the system memory 1114 and then accessed and executed by the processor 1102. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1100 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   determining, by a computer system, a bit rate at which to encode a source video having a source video file size;
   encoding, by the computer system, the source video at the determined bit rate to produce an encoded video that has a file size less than the source video file size;
   determining, by the computer system, whether a video quality metric for the encoded video is within an allowable deviation from a target quality metric;
   obtaining, by the computer system, information indicative of an amount of detail included in the source video from the encoding of the source video at the determined bit rate;
   determining, by the computer system, an optimized video that is similar to the source video, wherein a video quality metric for the optimized video is within the allowable deviation from the target quality metric; and
   in response to determining, by the computer system, that the video quality metric for the encoded video is outside the allowable deviation from the target quality metric:
      determining, by the computer system, another bit rate at which to encode the source video, based on the information indicative of the amount of detail included in the source video obtained from the encoding of the source video at the determined bit rate and based on historical data associated with the optimized video, the historical data including a bit rate used to encode the optimized video; and
      encoding, by the computer system, the source video at the other determined bit rate.

2. The computer-implemented method of claim 1, wherein the encoding the source video at the other determined bit rate is performed iteratively until the video quality metric for the encoded video is determined to be within the allowable deviation from the target quality metric.

3. The computer-implemented method of claim 2, wherein the video quality metric for the encoded video is determined to be outside the allowable deviation when the video quality metric for the encoded video is substantially greater than the target quality metric, and wherein the other determined bit rate is selected to be lower than the bit rate at which the source video was encoded in a previous iteration.

4. The computer-implemented method of claim 2, wherein the video quality metric for the encoded video is determined to be outside the allowable deviation when the video quality metric for the encoded video is substantially less than the target quality metric, and wherein the other determined bit rate is selected to be higher than the bit rate at which the source video was encoded in a previous iteration.

5. The computer-implemented method of claim 1, wherein the video quality metric for the encoded video corresponds to at least one of a structural similarity (SSIM) index, a multi-scale structural similarity (MS-SSIM) index, or a peak signal-to-noise ratio (P SNR).

6. The computer-implemented method of claim 1, wherein the target quality metric corresponds to a structural similarity (SSIM) index of 0.975.

7. The computer-implemented method of claim 1, wherein the determining the bit rate further comprises selecting the bit rate using, at least in part, a root finding algorithm.

8. The computer-implemented method of claim 7, wherein the root finding algorithm corresponds to at least one of Brent's method, Newton's method, a bisection method, a secant method, an interpolation method, or a combination thereof.

9. The computer-implemented method of claim 1, wherein the determined bit rate at which to encode the source video is determined based on historical data.

10. The computer-implemented method of claim 1, further comprising:
    receiving an original video prior to receiving the source video; and
    applying a first-pass encoding process to the original video to produce the source video having the source video file size.

11. A system comprising:
    at least one processor; and
    a memory storing instructions configured to instruct the at least one processor to perform:
       determining a bit rate at which to encode a source video having a source video file size;
       encoding the source video at the determined bit rate to produce an encoded video that has a file size less than the source video file size;
       determining whether a video quality metric for the encoded video is within an allowable deviation from a target quality metric;

obtaining information indicative of an amount of detail included in the source video from the encoding of the source video at the determined bit rate;

determining an optimized video that is similar to the source video, wherein a video quality metric for the optimized video is within the allowable deviation from the target quality metric; and in response to determining that the video quality metric for the encoded video is outside the allowable deviation from the target quality metric:

determining another bit rate at which to encode the source video, based on the information indicative of the amount of detail included in the source video obtained from the encoding of the source video at the determined bit rate and based on historical data associated with the optimized video, the historical data including a bit rate used to encode the optimized video; and encoding the source video at the other determined bit rate.

12. The system of claim 11, wherein the encoding the source video at the other determined bit rate is performed iteratively until the video quality metric for the encoded video is determined to be within the allowable deviation from the target quality metric.

13. The system of claim 12, wherein the video quality metric for the encoded video is determined to be outside the allowable deviation when the video quality metric for the encoded video is substantially greater than the target quality metric, and wherein the other determined bit rate is selected to be lower than the bit rate at which the source video was encoded in a previous iteration.

14. The system of claim 12, wherein the video quality metric for the encoded video is determined to be outside the allowable deviation when the video quality metric for the encoded video is substantially less than the target quality metric, and wherein the other determined bit rate is selected to be higher than the bit rate at which the source video was encoded in a previous iteration.

15. The system of claim 11, wherein the video quality metric for the encoded video corresponds to at least one of a structural similarity (SSIM) index, a multi-scale structural similarity (MS-SSIM) index, or a peak signal-to-noise ratio (P SNR).

16. A non-transitory computer storage medium storing computer-executable instructions that, when executed, cause a computer system to perform a computer-implemented method comprising:

determining a bit rate at which to encode a source video having a source video file size;

encoding the source video at the determined bit rate to produce an encoded video that has a file size less than the source video file size;

determining whether a video quality metric for the encoded video is within an allowable deviation from a target quality metric;

obtaining information indicative of an amount of detail included in the source video from the encoding of the source video at the determined bit rate;

determining an optimized video that is similar to the source video, wherein a video quality metric for the optimized video is within the allowable deviation from the target quality metric; and in response to determining that the video quality metric for the encoded video is outside the allowable deviation from the target quality metric:

determining another bit rate at which to encode the source video, based on the information indicative of the amount of detail included in the source video obtained from the encoding of the source video at the determined bit rate and based on historical data associated with the optimized video, the historical data including a bit rate used to encode the optimized video; and encoding the source video at the other determined bit rate.

17. The non-transitory computer storage medium of claim 16, wherein the encoding the source video at the other determined bit rate is performed iteratively until the video quality metric for the encoded video is determined to be within the allowable deviation from the target quality metric.

18. The non-transitory computer storage medium of claim 17, wherein the video quality metric for the encoded video is determined to be outside the allowable deviation when the video quality metric for the encoded video is substantially greater than the target quality metric, and wherein the other determined bit rate is selected to be lower than the bit rate at which the source video was encoded in a previous iteration.

19. The non-transitory computer storage medium of claim 17, wherein the video quality metric for the encoded video is determined to be outside the allowable deviation when the video quality metric for the encoded video is substantially less than the target quality metric, and wherein the other determined bit rate is selected to be higher than the bit rate at which the source video was encoded in a previous iteration.

20. The non-transitory computer storage medium of claim 16, wherein the video quality metric for the encoded video corresponds to at least one of a structural similarity (SSIM) index, a multi-scale structural similarity (MS-SSIM) index, or a peak signal-to-noise ratio (P SNR).

\* \* \* \* \*